United States Patent
House et al.

(10) Patent No.: US 7,194,257 B2
(45) Date of Patent: Mar. 20, 2007

(54) AUTOMATIC DIALING FOR A WIRELESS COMMUNICATIONS DEVICE

(75) Inventors: Chris House, Cary, NC (US); Gregory Dunko, Cary, NC (US)

(73) Assignee: Sony Ericsson Mobile Communications AB (SE)

(*) Notice: Subject to any disclaimer, the term of this patent is extended or adjusted under 35 U.S.C. 154(b) by 100 days.

(21) Appl. No.: 11/023,192

(22) Filed: Dec. 27, 2004

(65) Prior Publication Data

US 2006/0141991 A1    Jun. 29, 2006

(51) Int. Cl.
*H04M 3/00* (2006.01)

(52) U.S. Cl. ............. 455/418; 455/412.1; 455/414.1; 455/550.1; 379/88.08; 379/88.09

(58) Field of Classification Search ............ 455/412.1, 455/418, 414.1, 550.1; 379/88.08, 88.09
See application file for complete search history.

(56) References Cited

U.S. PATENT DOCUMENTS

| | | | | |
|---|---|---|---|---|
| 5,905,789 A | * | 5/1999 | Will | 379/211.03 |
| 6,016,342 A | | 1/2000 | Schwartz et al. | |
| 6,084,954 A | | 7/2000 | Harless et al. | |
| 6,134,437 A | * | 10/2000 | Karabinis et al. | 455/427 |
| 6,167,117 A | * | 12/2000 | Will | 379/88.03 |
| 2003/0013494 A1 | * | 1/2003 | Imura | 455/566 |
| 2004/0192270 A1 | * | 9/2004 | Kreitzer | 455/414.1 |
| 2004/0203669 A1 | | 10/2004 | Geshiro | |

FOREIGN PATENT DOCUMENTS

WO    WO 03/065698    8/2003

OTHER PUBLICATIONS

PCT International Search Report, International Application No. PCT/US2005/030450, Dec. 12, 2005.

* cited by examiner

*Primary Examiner*—Danh Cong Le
(74) *Attorney, Agent, or Firm*—Coats & Bennett, P.L.L.C.

(57) ABSTRACT

A wireless communications device comprises a transceiver, memory, and a controller. The transceiver permits a user to communicate with a remote party via a wireless communications network. Whenever the user places an outgoing call, the controller stores characteristics of the outgoing call in memory. These include the phone number of the remote party, the time of day and/or day-of-week the outgoing call was made, the location of the wireless communications device when placing the outgoing call, and the identity of a short-range transceiver with which the wireless communications device established a communications link when placing the outgoing call. Periodically, the controller analyzes the stored characteristics, and determines a call pattern for the remote party based on the users call history. Based on the determined call pattern, the controller is able to predict when the user will likely place a subsequent outgoing call to the remote party.

37 Claims, 9 Drawing Sheets

| CALL LIST | | |
|---|---|---|
| STEVE | 555-1722 | 12/1/2004 @ 6:00 PM |
| GREG | 555-7383 | 11/30/2004 @ 3:00 PM |
| ⋮ | ⋮ | ⋮ |
| CHRIS | 555-3164 | 11/28/2004 @ 1:30 PM |
| ⋮ | ⋮ | ⋮ |

AUTOMATIC DIALING FOR A WIRELESS COMMUNICATIONS DEVICE

BACKGROUND

The present invention relates generally to wireless communications devices, and particularly to wireless communications devices configured to organize and use stored information when placing outgoing calls.

Wireless communications devices currently come equipped with software and hardware that provide a user with a broad range of functionality. For example, most manufacturers include a variety of application programs such as integrated phone/address book applications. These application programs permit a user to store and organize characteristics associated with one or more remote parties, (e.g., name and/or phone number), and to select a remote party with which to converse. Conventionally configured devices, however, require user interaction, and thus, can only dial a manually-selected phone number. Moreover, the user is typically solely responsible for entering the characteristics, updating the characteristics, and ensuring the accuracy of the characteristics used in placing the outgoing calls.

Currently wireless communications devices do not come equipped with logic that permits the device to learn a user's calling habits by analyzing past calls, and predict when a user is likely to make a subsequent outgoing call to a remote party based on this analyzed call history. Accordingly, users would find such a device useful.

SUMMARY

The present invention provides an apparatus and method to predict when a user is likely to place an outgoing call to a remote party based on the users past calling habits. In one embodiment, a wireless communications device comprises a transceiver, memory, and a controller. The transceiver permits a user to communicate with one or more remote parties via a wireless communications network. Whenever the user places an outgoing call, the controller stores characteristics representative of the outgoing calls. These may include the phone numbers of the remote parties, a time of day and/or day-of-week the outgoing calls were made, a location of the wireless communications device when placing the outgoing calls, or an identity of a short-range transceiver with which the wireless communications device established a communications link when placing the outgoing calls. The controller may also store other characteristics. Periodically, the controller analyzes the stored characteristics individually or in any combination thereof to learn the users past calling habits regarding the remote parties. Based on a call pattern, the controller predicts when the user will likely place a subsequent outgoing call to a remote party, or which remote party the user is likely to call under some set of circumstances. The controller may then "queue" the predicted call for the user, or may place the call for the user.

The controller may analyze the stored characteristics responsive to some event, such as when the user launches an application program, opens the flip on the wireless communications device, or establishes a short-range communications link with a recognized short-range transceiver. Alternatively, the controller may analyze the data at periodic intervals, or whenever the wireless communications device travels proximate some location. In one embodiment, the location is determined when the wireless communications device registers with or is handed off to a recognized base station. In other embodiments, location is determined periodically using Global Positioning Satellite (GPS) navigation signals, or other known terrestrial methods.

Prior to placing a predicted call, the present invention may display a prompt that asks the user to confirm the placement of the call. The user may confirm placement of the call by actuating pre-configured keys on a keypad, for example. In embodiments where dialing is automatic, the user may have a specified period in which to abort the automatic dialing procedure. In other embodiments, the controller may generate and display an icon or shortcut that causes the controller to dial the remote party's number when actuated by the user. Additionally, the controller may generate and store a list in memory that lists the predicted subsequent calls. To make a call, the user merely selects a remote party from the list. The controller may also adjust call times for various time zones to ensure that any subsequently placed calls are made at substantially the same time.

DETAILED DESCRIPTION

Figure 1:
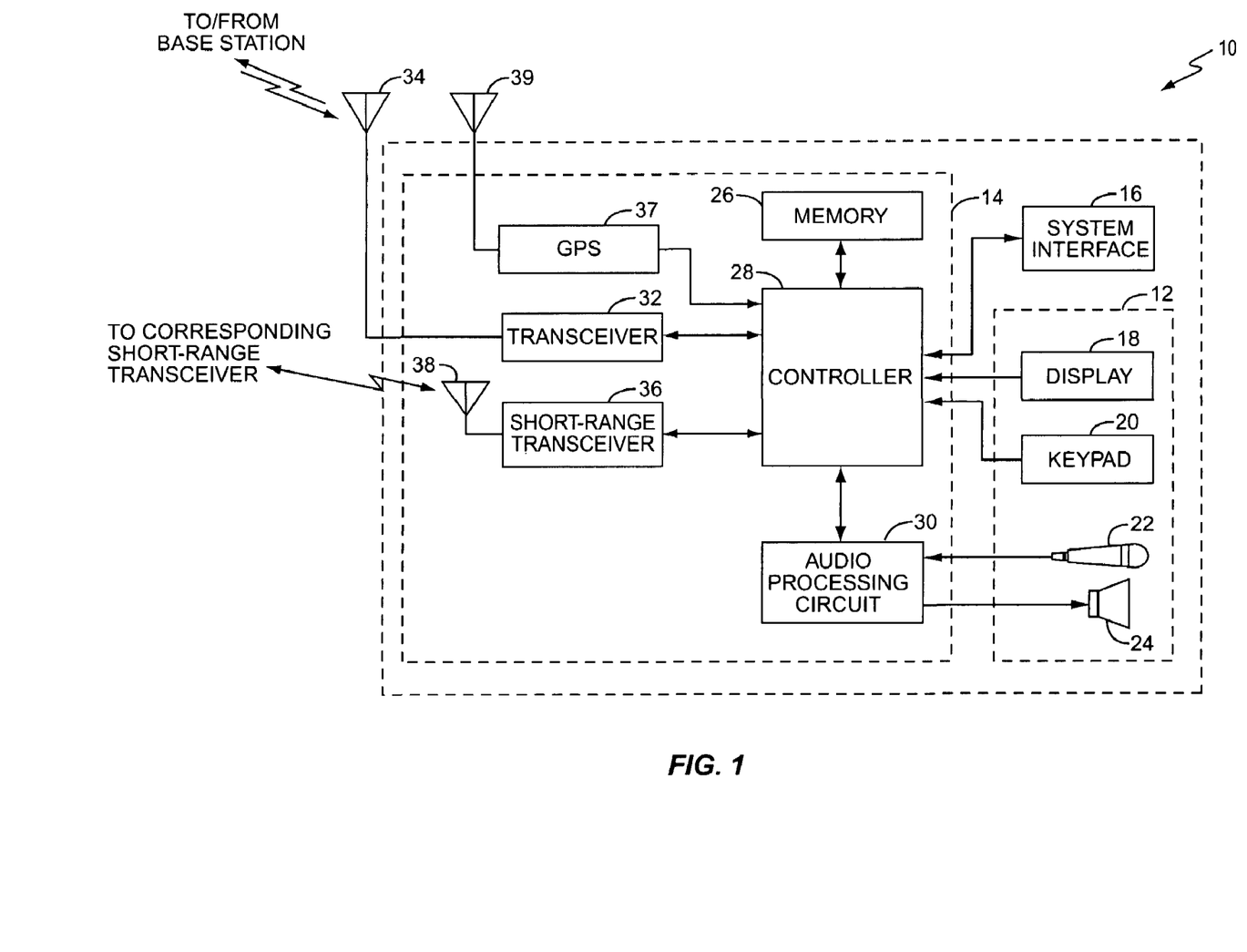
FIG. 1 illustrates a wireless communications device according to one embodiment of the present invention.

Turning now to the drawings, FIG. 1 illustrates a wireless communications device according to one embodiment of the present invention. It should be noted that the figures illustrate the wireless communications device in terms of a cellular telephone. However, those skilled in the art will readily appreciate that the present invention is not limited solely to cellular telephones, but is applicable to any consumer electronics device having communications capability including, but not limited to, Personal Digital Assistants (PDA), palm or laptop computers, and satellite phones.

As seen in FIG. 1, cellular telephone 10 comprises a user interface 12, communications circuitry 14, and a system interface 16. User interface 12 includes a display 18, a keypad 20, a microphone 22, and a speaker 24. Display 18 displays a graphical interface and permits users to view dialed digits, call status, menu options, and other service information. The graphical interface may include icons, menus, and other symbols and/or text. Keypad 20, disposed on a face of device 10, includes an alphanumeric keypad and other input controls such as a joystick, button controls, or dials that allow the operator to dial numbers, enter commands, and select options from menu systems. Microphone 22 converts the user's speech into electrical audio signals, and speaker 24 converts audio signals into audible sounds that can be heard by the user.

Communications circuitry 14 comprises memory 26, a controller 28, an audio processing circuit 30, a long-range transceiver 32 having an antenna 34, a short-range transceiver 36 having an antenna 38, and optionally, a positioning receiver, such as a GPS receiver 37 coupled to an antenna 39. Memory 26 represents the entire hierarchy of memory in device 10, and may include both random access memory (RAM) and read-only memory (ROM). Computer program instructions and data required for operation are stored in non-volatile memory, such as EPROM, EEPROM, and/or flash memory, and may be implemented as discrete devices, stacked devices, or integrated with controller 28. Memory 26 may store information such as the characteristics associated with one or more outgoing calls placed by the user.

Controller 28 controls the operation of device 10 according to programs and/or data stored in memory 26. The control functions may be implemented in a single controller, or in multiple controllers. Suitable controllers may include, for example, both general purpose and special purpose controllers and digital signal processors. Controller 28 may interface with audio processing circuit 30, which provides basic analog output signals to speaker 24 and receives analog audio inputs from microphone 22. Controller 28, as will be described in more detail below, is configured to analyze the characteristics stored in memory 26, use those characteristics to determine a call pattern for a given remote party, and predict a subsequent call to the remote party made by the user.

Transceiver 32 is coupled to antenna 34 for receiving and transmitting cellular signals from and to one or more base stations in a wireless communications network. Transceiver 32 is a fully functional cellular radio transceiver, and operates according to any known standard, including but not limited to Global System for Mobile Communications (GSM), TIA/EIA-136, cdmaOne, cdma2000, UMTS, and Wideband CDMA. Transceiver 32 preferably includes baseband-processing circuits to process signals transmitted and received by the transceiver 32. Alternatively, the baseband-processing circuits may be incorporated in the controller 28.

Short-range transceiver 36 is coupled to antenna 38 for transmitting and receiving signals to and from a corresponding short-range transceiver. In one embodiment, short-range transceiver 36 is a BLUETOOTH transceiver or RF transceiver operating according to the IEEE 802.11(b) or 802.11(g) standards. As is well known in the art, BLUETOOTH is a universal radio interface that permits the creation of ad hoc networks, and is particularly well-suited for communications over short distances. For further details regarding BLUETOOTH technology, the interested reader may refer to "Bluetooth—The Universal Radio Interface for ad hoc, wireless connectivity," presented by Jaap Haartsen in Ericsson Review No. 3, 1998, which is herein incorporated by reference. It should be understood that short-range transceivers 36 may utilize any technology known in the art operable to transmit and receive signals over short distances, for example, infra-red and hardwired cables.

Cellular telephone 10 may also include a positioning receiver, such as GPS receiver 37, for receiving satellite navigation signals from one or more satellites in orbit around the earth. Two such examples of satellite navigation systems include the U.S. Global Positioning System (GPS) and its Russian equivalent GLOSNASS. However, it should be understood that the present invention might operate using any satellite navigation system. As is known in the art, cellular telephone 10 may use these signals to determine its current geographical location independently, or it may use assistance data received from the network, such as satellite ephemeris and/or almanac data to approximate its location. Although FIG. 1 explicitly shows cellular telephone 10 including a GPS receiver 37, those skilled in the art will readily appreciate that the inclusion of a positioning receiver in cellular telephone 10 is optional, and not required by the present invention. A wide variety of systems and methods for determining and tracking the location of a cellular telephone 10 that does not include a positioning receiver are also available. These include, but are not limited to, network-based location determination methods based on relative signal strength, propagation delay, phase shift, or the like. Any of these methods may be used to determine the location of cellular telephone 10 and advantageously applied to the present invention.

Figure 2:
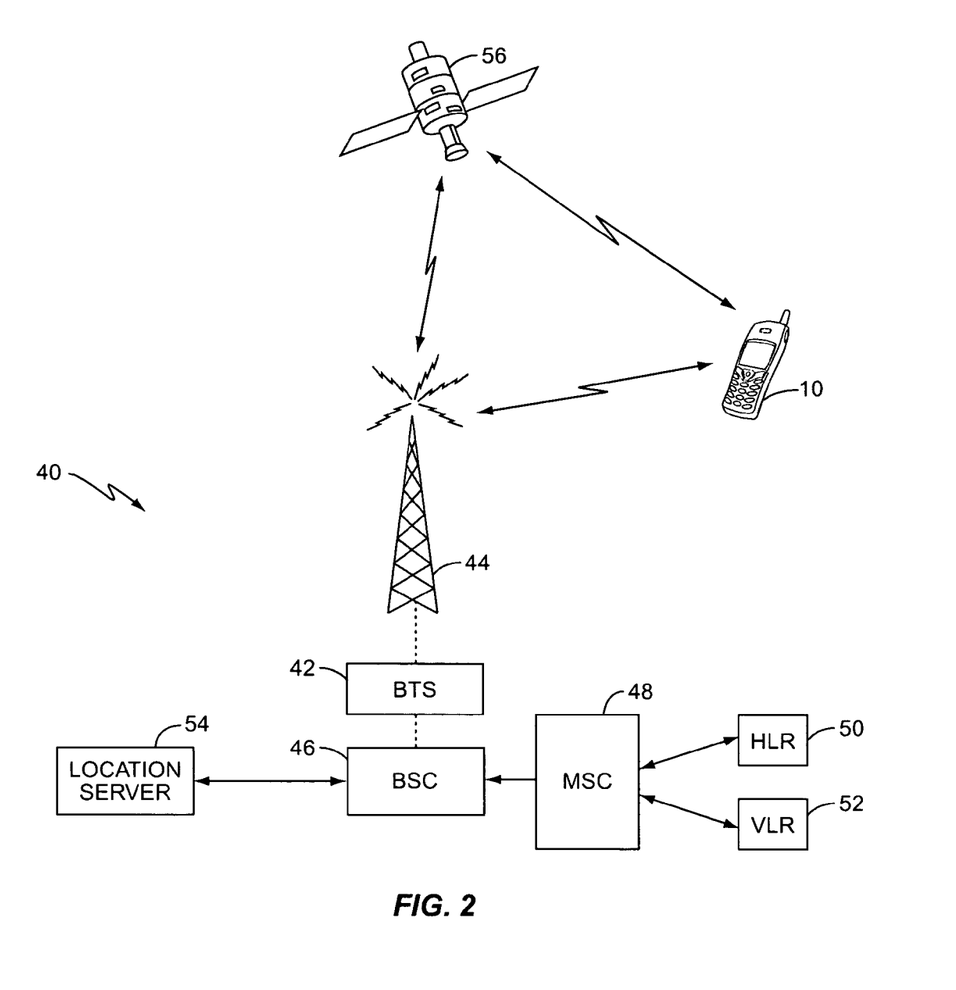
FIG. 2 illustrates a communications network of the type in which a wireless communications device configured according to one embodiment of the present invention may operate.

FIG. 2 illustrates one possible wireless network configuration in which cellular telephone 10 may operate. Network 40 comprises a Base Transceiver Station (BTS) 42 having an antenna 44, a Base Station Controller (BSC) 46, a Mobile Switching Center (MSC) 48, a Home Location Register (HLR) 50, a Visitor Location Register (VLR) 52, and a Location Server 54. One or more satellites 56 may also be present to provide cellular telephone 10 with GPS navigation signals, as is known in the art. Network 40 may operate according to any known standards, such as Global System for Mobile Communications (GSM), TIA/EIA-136, cdmaOne, cdma2000, UMTS, and Wideband CDMA.

Together, BTS 42 and BSC 46 typically comprise a Base Station Subsystem (BSS). BTS 42 includes radio transmission and reception equipment, up to and including the antenna 44, and includes the signal processing specific to the radio interface provided to cellular telephone 10. The BSC 46 performs most of the management and control functions, for example, resource allocation and handover management. BSC 46 may be communicatively linked to HLR 50 and VLR 52 via MSC 48, as is known in the art. MSC 48 is effectively a sophisticated telephone exchange that provides circuit-switched services to cellular telephone 10 in a certain geographical area. Typically, these services include voice and fax services, but may also include dial-up data services. HLR 50 is the entity where a subscriber's data is stored, such as the subscriber's International Mobile Subscriber Identity (IMSI), phone number, and a current location of cellular telephone 10 provided by Location Server (LS) 54. VLR 52 is a registry of which subscribers are currently roaming in a particular area. Data stored is similar to that in the HLR 50, and in fact, is typically updated using data stored on HLR 50. In practice, HLR 50 and VLR 52 may be integrated with MSC 48 for performance reasons, although this is not required.

While the MSC 48, HLR 50, and VLR 52 are known entities, they may be configured to operate according to an alternate embodiment of the present invention. Particularly, HLR 50 and/or VLR 52 may store the characteristics associated with the user's outgoing calls as described above. As will be described later in more detail, MSC 48 may be configured to periodically analyze these characteristics to determine a call pattern, predict the placement of a subsequent outgoing call, and place and/or notify a user of cellular telephone 10 of the subsequent outgoing call.

As previously stated, conventional wireless communications devices typically include application programs that allow a user to manually organize and recall contact information regarding one or more remote parties upon demand. However, this information and functionality is typically limited in nature. The present invention, however, automatically stores characteristics of outgoing calls as the user makes them. From these characteristics, the present invention determines call patterns to a remote party, and predicts when the user will make a subsequent call to the remote party.

Figure 3:
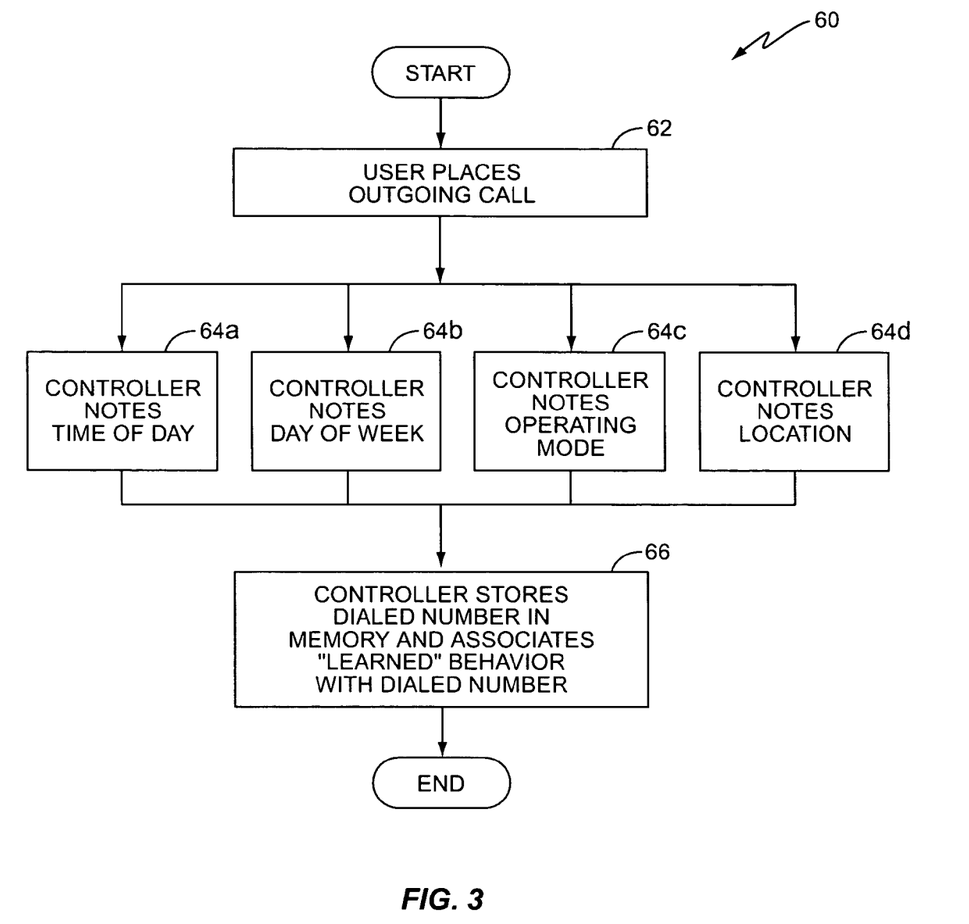
FIG. 3 illustrates a method by which a wireless communications device configured according to one embodiment of the present invention stores characteristics about outgoing calls.

FIG. 3 illustrates one method 60 by which the present invention operates to store outgoing call characteristics. Method 60 begins when the user places an outgoing call to a remote party (box 62). The controller 28 will note the telephone number of the remote party, as well as the characteristics of the outgoing call. As seen in FIG. 3, these include the time of day (box 64a), the day of the week (box 64b), the operating mode of cellular telephone 10 (box 64c), and/or the location of cellular telephone 10 (box 64d). Controller 28 then associates the characteristics 64a–64d with the dialed number, and stores them in memory 26 (box 66).

Figure 4:
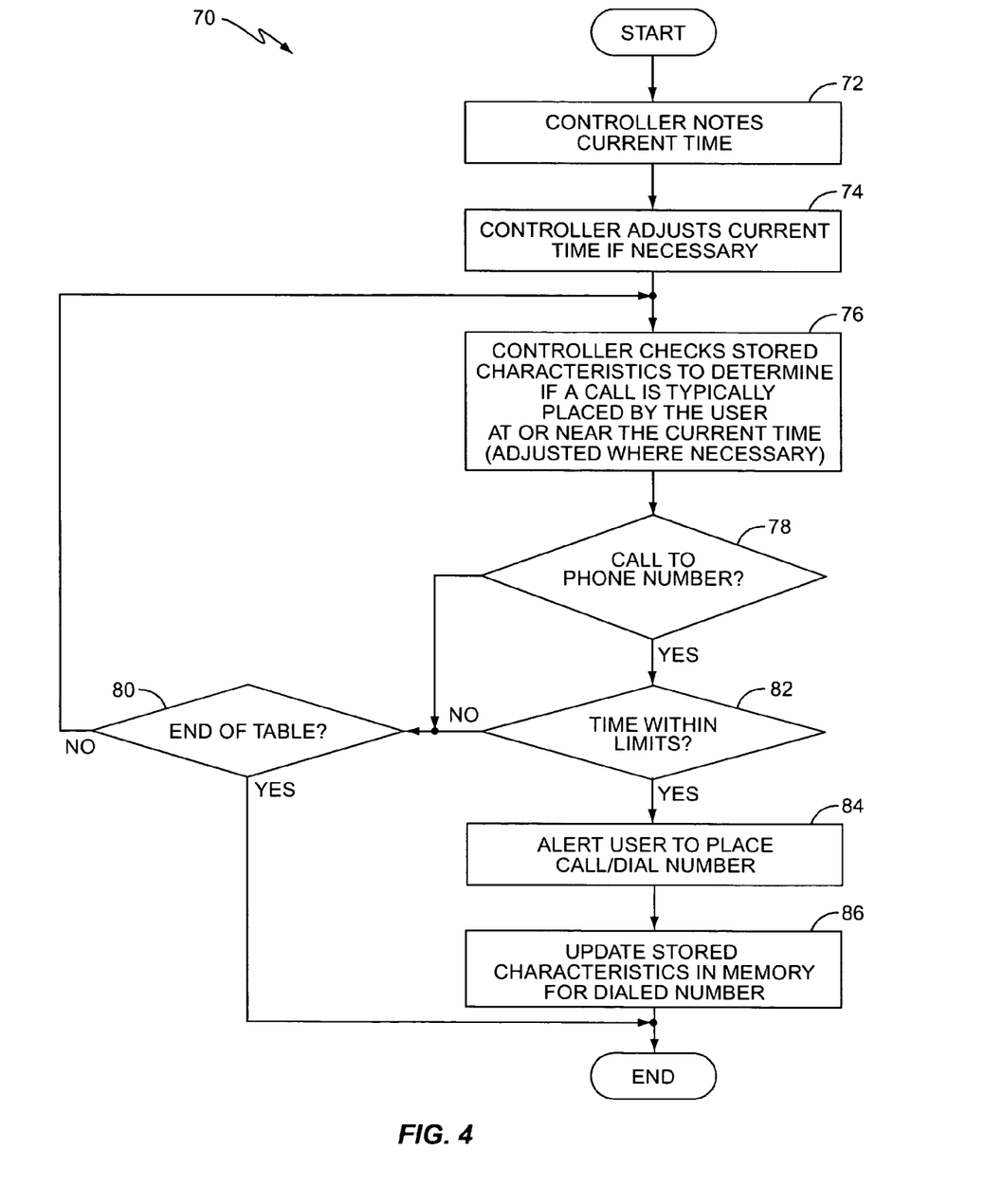
FIG. 4 illustrates a method by which a wireless communications device configured according to one embodiment of the present invention uses the stored characteristics to place outgoing calls.

FIG. 4 illustrates a method 70 according to one embodiment of the present invention wherein controller 28 determines a call pattern responsive to some event, such as the user invocation of a telephone application on cellular telephone 10. In the embodiment of FIG. 4, outgoing call characteristics, and the phone numbers they are associated with, are stored in a table in memory 26. However, any method of storing and organizing the information may be used. Each record or entry in the table could include at least the phone number of a remote party and a time of day in which the user typically places an outgoing call to the remote party. The time of day in this example is stored according to the user's local time zone. For simplicity only, FIG. 4 illustrates method 70 in terms of the time of day characteristic shown in FIG. 3; however, other characteristics may be used in place of or in addition to the time of day.

Method 70 begins with controller 28 noting the current time (box 72), and adjusting the current time if necessary or desired according to a local time zone (box 74), which is described in more detail later. Controller 28 then checks each record in the stored outgoing call characteristics table to determine a call pattern for each associated phone number in the table (box 76). If the pattern reveals that the user does not typically place a call to that number (box 78), controller 28 checks to see if it has reached the end of the table (box 80). However, if controller 28 determines that the user typically places an outgoing call to the number (box 78), it may apply a threshold test to ensure that the outgoing call is normally placed at or near the current time to the phone number (box 82). For example, a user might configure a threshold value of five minutes and store the value in memory 26. Controller 28 could compare the current time to the stored time of day characteristic for the entry to determine if the difference between the two times is five minutes or less. If controller 28 determines that the user typically places an outgoing call to the phone number and it is within the specified time threshold, controller 28 may alert the user to make the call, or automatically place the call for the user, or both (box 84).

In one embodiment, for example, the user could configure the present invention to display a message and/or render an audible sound through speaker 24 to alert the user to the placement of a predicted call. The user could confirm the placement of the call simply by actuating a key on keypad 20. In another embodiment, controller 28 displays the message and/or renders the audible sounds and automatically places the call without waiting for confirmation by the user. In still other embodiments, controller 28 generates a graphical interface with which the user may interact to place subsequent outgoing calls. In these cases, the call is placed when the user actuates an object associated with the graphical interface. Regardless of how controller 28 places the subsequent call, the characteristics of the outgoing call (e.g., the time of day the call is made) may be used to update those characteristics already stored in memory 26 (box 86).

As stated above, controller 28 may determine the current time and adjust the current time when necessary. This is helpful, for example, when cellular telephone 10 is roaming in a time zone that differs from its home time zone. In one embodiment, cellular telephone 10 may adjust the current time according to information transmitted by a serving network. For example, cellular telephone 10 may periodically receive the current time and time zone information from a serving wireless network that includes a Network Identity and Time Zone (NITZ). For details regarding the NITZ, the interested reader may refer to 3GPP TS 22.042 v.5.1.0 dated June 2003, and entitled "$3^{rd}$ Generation Partnership Project; Technical Specification Group Services and System Aspects; Network Identity and Time Zone (NITZ); Service Description, Stage 1 (Release 5)," which is herein incorporated by reference. Briefly, the NITZ provides a way for a serving network to transfer its current identity, time, Daylight Saving Time, time zone, and other parameters to cellular telephone 10. If the NITZ provides a time zone that is different from the user's home time zone, controller 28 could use the NITZ to ensure that any subsequent outgoing call would be placed at a proper time.

Consider, for example, a user who calls his spouse daily at about 6:00 p.m. Eastern Standard Time (EST). When traveling to the west coast, the current time would be three hours earlier than the user's home time zone. To prevent predicting or placing the user's daily outgoing call according to Pacific Standard Time (PST), controller 28 could use the NITZ to determine its current time zone and adjust the current time to reflect EST. Alternatively, controller 28 could use the NITZ to adjust the stored time of day characteristics to reflect PST. In either case, controller 28 would be able to use the time zone information to properly determine a call pattern, and predict or place the call at the appropriate time.

FIG. 4 illustrates the present invention in terms of the time of day characteristic (i.e., a daily call made around a certain time every day); however, the present invention is not so limited. In another embodiment, controller 28 predicts subsequent calls based on both the time of day and day of week characteristics. In this embodiment, controller 28 could simply perform additional comparisons to determine if the user places outgoing calls to a remote party at the current time and day (e.g., every Friday night at 6:00 p.m). As above, controller 28 could still adjust for the time zone where necessary.

Figure 5:
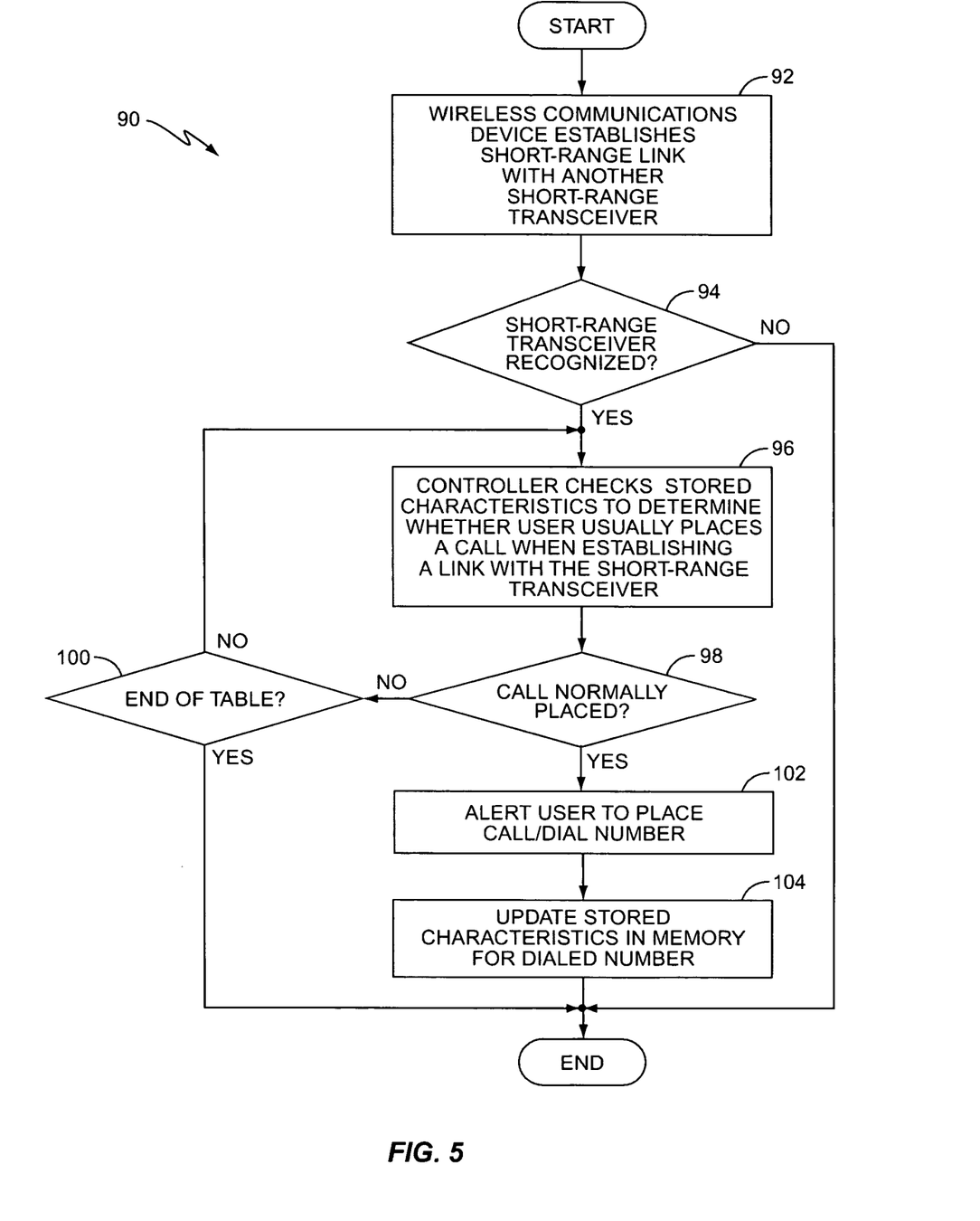
FIG. 5 illustrates an alternate method by which a wireless communications device configured according to one embodiment of the present invention uses the stored characteristics to place outgoing calls.

In another embodiment shown in FIG. 5, controller 28 uses a current operating mode cellular telephone 10 to determine whether the user typically places an outgoing call to a given remote party. The operating mode may be, for example, a mode that the cellular telephone 10 enters when it mates with or recognizes some accessory device. The accessories are associated with different profiles that define the operating mode of cellular telephone 10. When cellular telephone 10 mates with or senses these accessory devices, controller 28 changes the operating mode to operate according to the profile for the particular accessory device. A profile for a hands-free headset, for example, might change the operating profile of cellular telephone 10 such that controller 28 sends all audio to the speaker in the hands-free headset instead of speaker 24. Likewise, a profile for a vehicle kit in the user's car might change the operating profile of cellular telephone 10 such that send controller 28 sends the audio to an external speaker instead of speaker 24. Cellular telephone 10 recognizes when a profile changes and may determine a call pattern or place a predicted call responsive to the profile change.

In one embodiment, the operating mode comprises a short-range communications mode that cellular telephone 10 enters whenever a short-range communications link is established between cellular telephone 10 and a corresponding short-range transceiver. FIG. 5 illustrates one such embodiment. As seen in FIG. 5, method 90 begins when short-range transceiver 36 establishes a communications link with another short-range transceiver (box 92), such as a communications unit in the user's vehicle. Controller 28 checks the identity of the corresponding short-range transceiver to determine if the user typically places outgoing calls when it establishes a link with this particular unit (box 94). If controller 28 recognizes the corresponding short-range transceiver, controller 28 checks the identity of the short-range transceiver against the identities in the stored characteristics to determine if a call pattern exists (box 96).

For example, controller 28 could analyze the identities in the stored characteristics to determine if any match the identity of the short-range transceiver. If controller 28 determines that the user typically places an outgoing call to a remote party when establishing a communications link with the unit (box 98), controller 28 may alert the user and/or place the call to the remote party as described above (box 102). Alternatively, controller 28 could place the subsequent call in a queue or list, as described later in more detail. When controller 28 has reached the end of the table (box 100), method 90 ends. As in the previous embodiments, controller 28 may use the outgoing call characteristics drawn from the subsequent outgoing call to update the stored characteristics (box 104).

It should be understood that while FIG. 5 illustrates the operating mode as a short-range communications mode, the present invention is not so limited. Cellular telephone 10 may perform the steps of FIG. 5 whenever controller 28 senses that an operating mode or profile has been changed.

In an alternate embodiment similar to that illustrated in FIG. 5, controller 28 may perform the steps of method 90 based on whether cellular telephone 10 recognizes a given base station. Particularly, messaging (e.g., registration, handoff, etc.) occurs whenever cellular telephone 10 enters/exits a cell. Further, each base station in each of the cells has an assigned identity. When cellular telephone 10 enters a cell, the serving base station may transmit its identity to cellular telephone 10. If controller 28 recognizes the base station identity, it could compare the identity with those of the stored characteristics to determine whether the user typically places outgoing calls when registered with the base station. For example, a user might typically place outgoing calls to a friend when roaming in a particular area. Another example might be where a user typically places calls to a spouse whenever he returns to his home system after roaming in an area. If controller 28 recognizes these base stations when cellular telephone 10 registers with them, controller 28 could determine a call pattern, alert the user and/or place the outgoing call as previously described.

Figure 6:
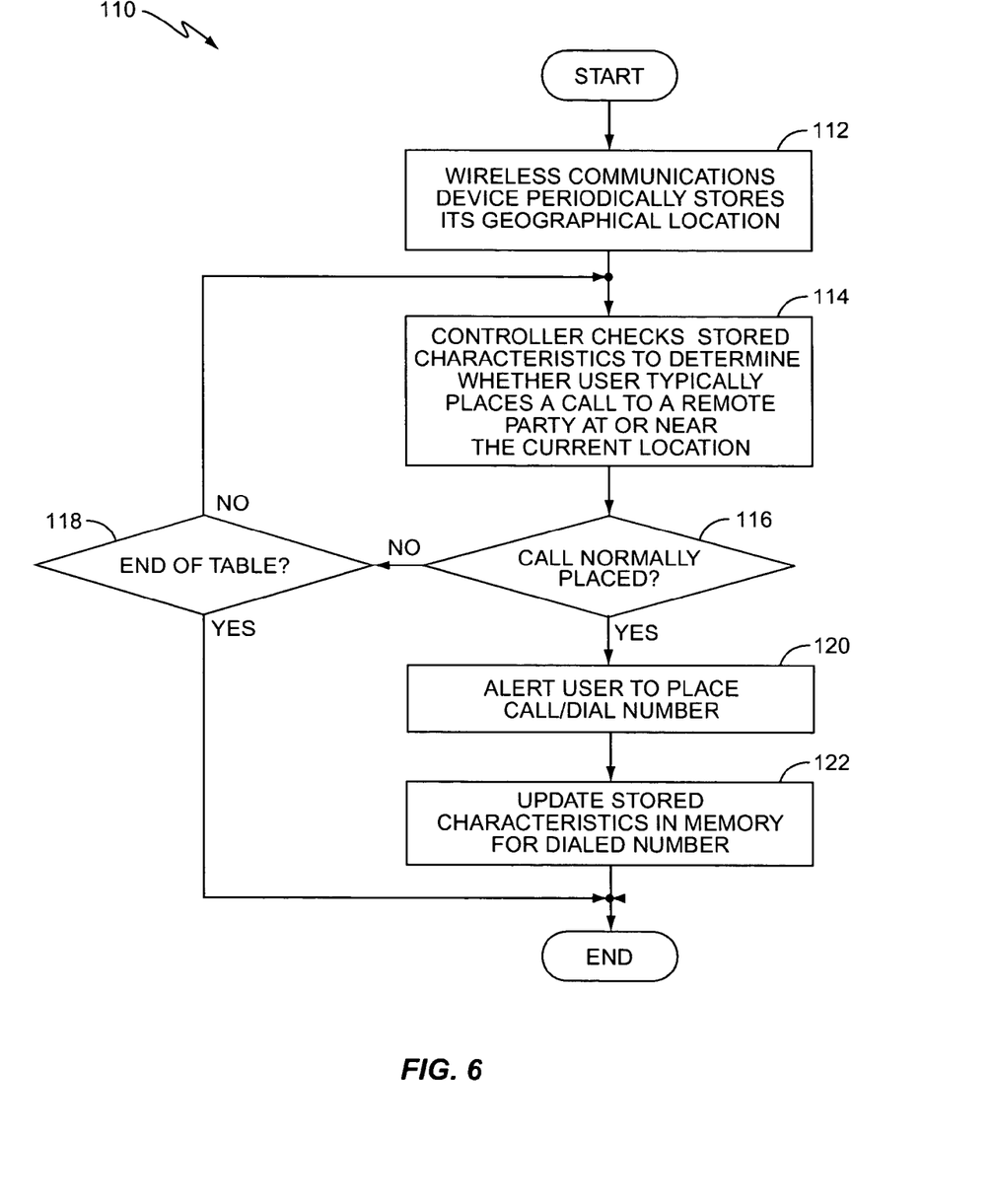
FIG. 6 illustrates another method by which a wireless communications device configured according to one embodiment of the present invention uses the stored characteristics to place outgoing calls.

FIG. 6 illustrates another location-based method 110 according to the present invention. In this embodiment, cellular telephone 10 stores the location at which the user typically places outgoing calls to a remote party. The location may be, for example, the coordinates of a particular intersection where the user typically places calls to a spouse. Controller 28 also periodically stores its geographical position in memory 26 (box 112). As stated above, cellular telephone 10 may determine or receive its geographical position using any method known in the art, for example, using GPS signals or other known terrestrial methods. Controller 28 may periodically check the stored characteristics to determine whether a user typically places a call to a remote party at or near its current position (box 114). For example, controller 28 may compare the location in the stored characteristics with its current position to determine a distance between the two. The controller 28 might also allow for some predetermined variance, such as one mile. If controller 28 determines that distance between its current position and the location indicated in the stored characteristics is not greater than the variance (box 116), controller 28 alerts the user, places the call to the remote party as previously described, or places the call in a queue or list for later access by the user (box 120). Of course, the user may configure controller 28 to define any variance desired. Once the call is placed, controller 28 updates the stored characteristics for the dialed number (box 122). As in the previous embodiments, controller 28 may perform these steps for each remote party stored in memory 26. When controller 28 reaches the end of the table (box 118), the method ends.

Figure 7:
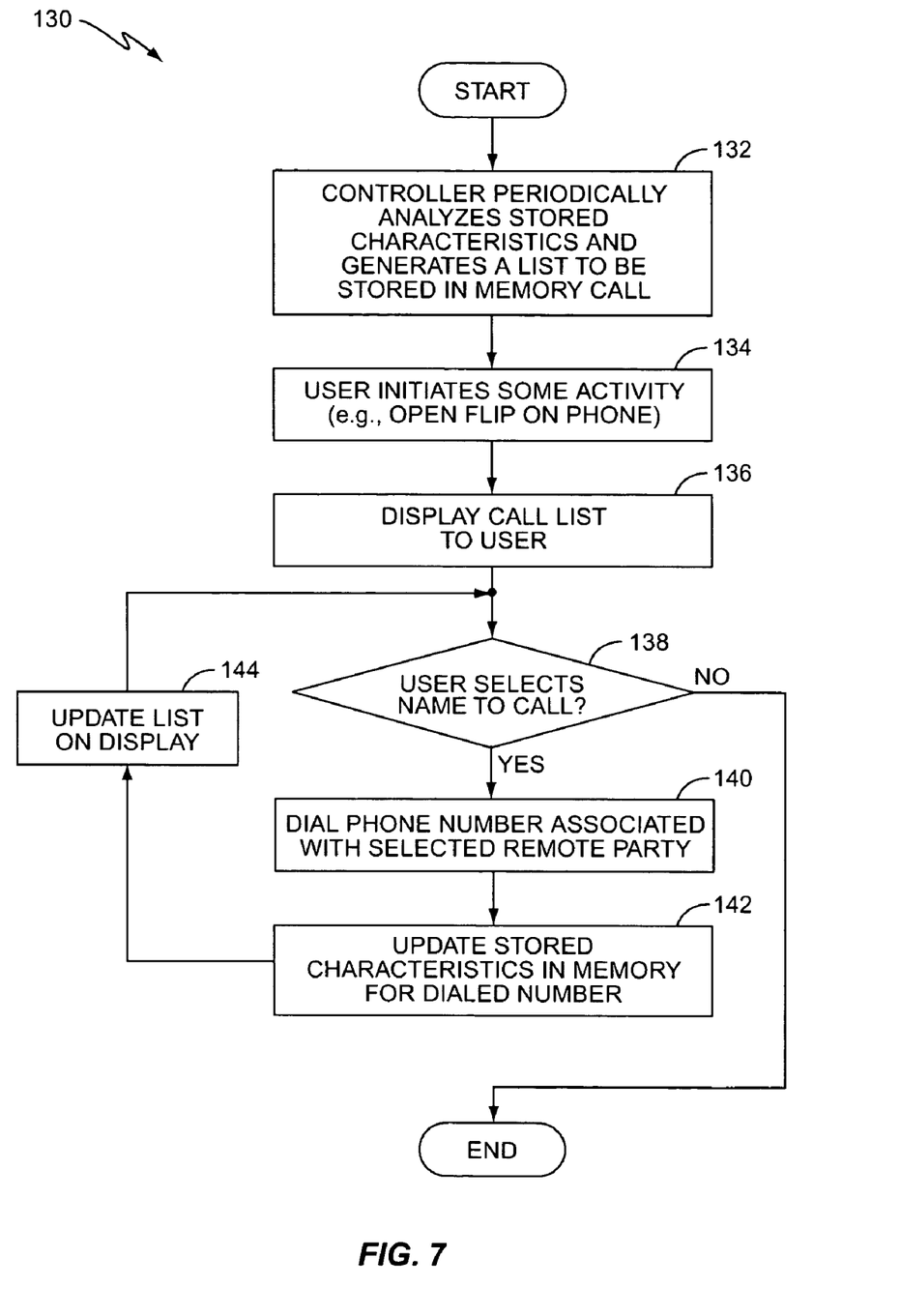
FIG. 7 illustrates another alternate method by which a wireless communications device configured according to one embodiment of the present invention uses the stored characteristics to place outgoing calls.

FIG. 7 illustrates an embodiment wherein the controller analyzes data and presents the user with a graphical interface that shows predicted subsequent calls based on the determined call pattern. The graphical interface may comprise, for example, a call list, icons, or any other graphical object desired. The user may interact with the graphical interface to place the subsequent outgoing calls predicted by controller 28.

In this embodiment, controller 28 may periodically analyze the stored characteristics and generate a call list that is stored in memory 26 (box 132). When the user initiates some activity, such as when the user opens the flip on cellular telephone 10 or activates cellular telephone 10 (box 134), controller 28 displays the call list to the user (box 136). If the user selects an entry from the call list (box 138), controller 28 dials the phone number associated with the selected remote party (box 140). Controller 28 could also update the stored characteristics in memory 26 for the remote party (box 142), and update the call list on the display 18 (box 144).

Figure 8A:
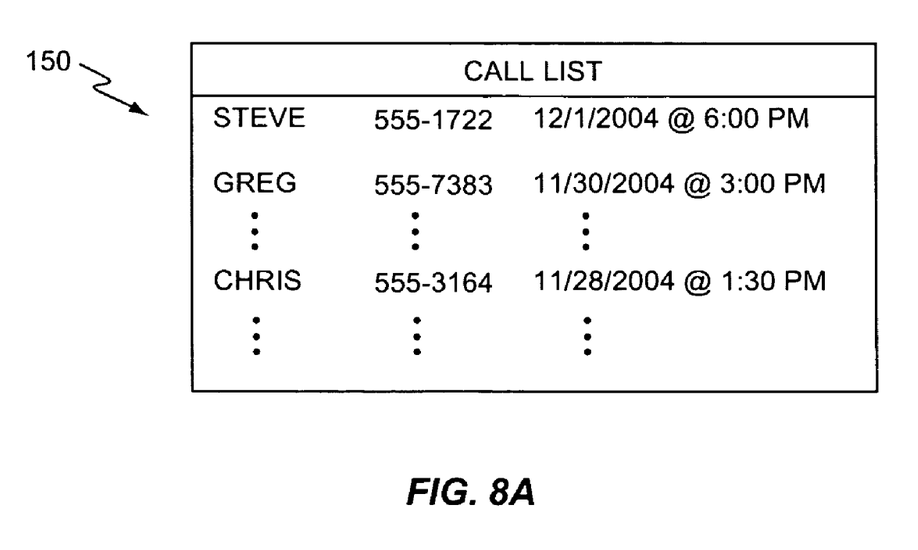
FIGS. 8A and 8B illustrate embodiments showing how information related to subsequent outgoing calls might be displayed to the user.

FIG. 8A illustrates one embodiment of the call list 150 described in FIG. 7. As seen in FIG. 8A, call list 150 comprises a number of entries, where each entry includes the name of a remote party, the telephone number associated with the remote party, and a date and time at which the subsequent is normally placed. The telephone numbers associated with the names of the remote parties may be, for example, home numbers, cell numbers, or work numbers. Thus, it is possible to have the name of a remote party associated with more than one phone number, or more than one entry for a remote party associated with a single phone number that is called under different sets of circumstances. For example, the user might call a spouse at home at a certain time of day (e.g., 7:00 p.m.), and at work at a different time of day (e.g., 1:00 p.m.). In these cases, the list would have two entries for the spouse—one with a home phone number, and one with a work phone number. In another example, the user might call a friend at home every Friday at 9:00 p.m., and whenever the user is proximate a certain location. In this case, the list might have two entries for the friend, both with the same phone number, but called under different circumstances.

To place a call, the user needs only to select an entry from the list. Controller 28 may remove entries from the list when a call is completed, or when a subsequent call is not successfully placed within a predetermined time set by the user. Likewise, controller 28 adds entries to the list after analyzing the stored characteristics. Therefore, controller 28 dynamically adds and removes entries to call list 150.

The user may configure controller 28 to prioritize the call list 150 in any manner desired. For example, call list 150 may be a list in which the entries are ordered according to a date-time based scheme. With this scheme, entries are ordered according to the date and time at which the user typically places calls to the remote parties. Pending or upcoming calls are placed first on the list, while missed or failed calls follow. Of course, other prioritizing schemes may be employed to order or prioritize the entries in the call list 150.

Figure 8B:
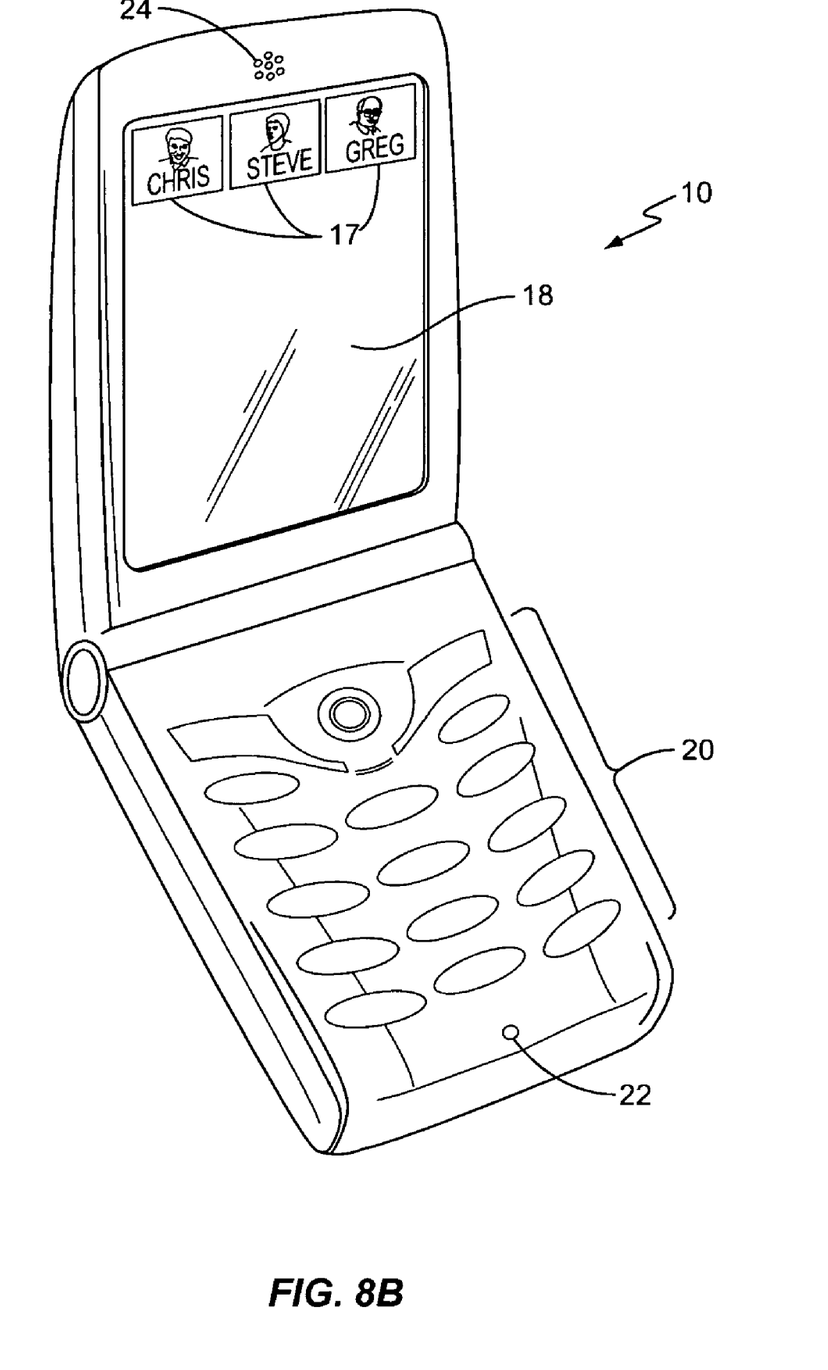

FIG. 8B illustrates an embodiment in which controller 28 automatically generates one or more icons 17 for display to the user after analyzing the stored characteristics. Each icon 17 may be associated with a phone book entry, for example, and would have access to the information contained in the phone book. When the user actuates an icon 17, controller 28 could dial the number associated with the particular remote party. As above, controller 28 could dynamically add and remove these icons 17 to display 18 and/or prioritize the icons 17 according to some user-defined scheme. For example, overdue or unsuccessful calls may be displayed in one color while pending or upcoming calls may be displayed in another color. Controller 28 could change the colors of icons 17 according to whether the calls were placed.

Those skilled in the art will readily appreciate that other outgoing call characteristics in addition to those already stated may also be tracked and stored by controller 28. In addition, the outgoing call characteristics are not mutually exclusive of one another. It should be understood that controller 28 might also be configured to track and store a plurality of outgoing call characteristics for each outgoing call placed by the user, and to determine and predict subsequent outgoing calls based on analyzing the combination of the plurality of stored outgoing call characteristics.

As stated above, the present invention permits the user to define time and/or distance thresholds that controller 28 may use to determine call patterns. In addition, however, the user may also define a percentage threshold. More specifically, the user might configure controller 28 to determine call patterns and/or place calls to a remote party depending upon the number of times the user calls the remote party under some set of circumstances. By way of example only, controller 28 might recognize a call pattern where the user calls a parent whenever the user within a quarter-mile of a given intersection 50% of the time. If the user has configured the percentage threshold to be 75%, controller 28 may not predict/place the call until the call pattern to the parent under these circumstances reaches or surpasses 75%. Conversely, if the user has defined the percentage threshold to be 40%, the controller 28 would predict or place the call to the parent.

Additionally, the present invention might also analyze the stored characteristics responsive to some user-initiated event, such as when the user opens the flip on cellular telephone 10 or activates cellular telephone 10. Additionally, controller 28 may analyze the stored characteristics whenever cellular telephone 10 establishes a short-range communications link, registers with a base station, or is positioned proximate some geographical location. In these cases, controller 28 may present the user with the appropriate remote party to call based on the determined call pattern and/or call list 150 or other queue.

Further, the present invention is not limited simply to being performed by controller 28. Rather, MSC 48 may comprise the logic and HLR 50 and/or VLR 52 could store the user's outgoing call characteristics. In this embodiment, MSC 48 could periodically check the user's data stored in HLR 50 and/or VLR52, and send a message to cellular telephone 10. Upon receipt, controller 28 could alert the user that a call is typically made at the current time or under the present conditions, or generate call list 150 or icons 17 as previously described. When a subsequent call is placed, controller 28 could return a confirmation message, or alternatively, a no-confirmation message, to MSC 48. MSC 48 could then place the subsequent outgoing call and send information about the call status to the user for display. MSC 48 could also update the characteristics stored in HLR 50/VLR 52.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless communications device comprising:
   a transceiver to communicate with a remote party via a wireless communications network;
   memory to store one or more geographic locations of the wireless communications device that indicate where a user was located when the user placed one or more previous outgoing calls to the remote party; and
   a controller configured to:
   determine a call pattern based on the geographic locations stored in memory and a current geographic location of the wireless communications device; and
   predict the placement of a subsequent outgoing call to the remote party based on the call pattern.

2. The device of claim 1 wherein the controller is configured to analyze the one or more geographic locations to determine the call pattern.

3. The device of claim 2 wherein the controller is configured to determine the call pattern responsive to a user-initiated action.

4. The device of claim 2 wherein the controller is configured to periodically determine the call pattern.

5. The device of claim 2 wherein the controller is configured to determine the call pattern based on the establishment of a communications link with a corresponding transceiver.

6. The device of claim 1 wherein the controller is further configured to determine the call pattern based on a current time.

7. The device of claim 6 wherein the controller is further configured to predict the placement of the subsequent outgoing call based on a calculated time difference between the current time and a time at which the one or more previous calls were placed to the remote party by the user.

8. The device of claim 7 wherein the controller is configured to predict the placement of the subsequent outgoing call if the calculated time difference does not exceed a predetermined threshold.

9. The device of claim 7 wherein the controller is configured to adjust the calculated time difference based on time zone information received from the wireless communications network.

10. The device of claim 7 wherein the controller is configured to predict the placement of the subsequent outgoing call based on a day that the one or more previous outgoing calls were placed to the remote party and the time difference.

11. The device of claim 1 wherein the controller is further configured to predict the placement of the subsequent outgoing call based on an operating mode that the wireless communications device was in when the one or more previous outgoing calls were placed to the remote party.

12. The device of claim 11 wherein the controller is further configured to predict the placement of the subsequent outgoing call based on the identity of a short-range transceiver with which the wireless communications device had previously established a short-range communications link when the one or more previous outgoing calls were placed to the remote party.

13. The device of claim 1 wherein the controller is further configured to predict the placement of the subsequent outgoing call based on a calculated distance between the current location of the wireless communications device and the one or more geographic locations stored in memory.

14. The device of claim 13 wherein the controller is configured to predict the placement of the subsequent outgoing call if the calculated distance is not greater than a predetermined threshold.

15. The device of claim 1 wherein the controller is further configured to predict the placement of the subsequent outgoing call based on an identity of a base station with which the wireless communications device was registered when the one or more previous outgoing calls were placed to the remote party.

16. The device of claim 1 wherein the controller is configured to alert the user of the placement of the subsequent outgoing call based on the call pattern.

17. The device of claim 1 wherein the controller is configured to generate a graphical interface based on the call pattern.

18. The device of claim 17 wherein the controller is configured to place the subsequent call responsive to the user actuating the graphical interface.

19. The device of claim 1 wherein the controller is further configured to:
   determine a location of the wireless communications device when the subsequent outgoing call is placed to the remote party; and
   update the one or more geographic locations stored in memory with the determined location.

20. A method of placing an outgoing call from a wireless communications device comprising:
   storing one or more geographic locations that indicate where a user of the wireless communications device was located when the user placed one or more previous outgoing calls to a remote party;
   analyzing the one or more geographic locations and a current geographic location of the wireless communications device to determine a call pattern; and
   predicting a subsequent call to the remote party based on the determined call pattern.

21. The method of claim 20 wherein analyzing the one or more geographic locations and a current geographic location of the wireless communications device to determine a call pattern comprises analyzing the one or more geographic locations and the current geographic location responsive to a user-initiated event.

22. The method of claim 21 wherein the user-initiated event comprises the activation of an application program stored in memory on the wireless communications device.

23. The method of claim 22 wherein the user-initiated event comprises the user opening a flip of the wireless communications device.

24. The method of claim 22 wherein the user-initiated event comprises the user activating the wireless communications device.

25. The method of claim 20 wherein analyzing the one or more geographic locations and a current geographic location of the wireless communications device to determine a call pattern comprises periodically analyzing the one or more geographic locations and the current geographic location.

26. The method of claim 20 wherein analyzing the one or more geographic locations and a current geographic location of the wireless communications device to determine a call pattern comprises analyzing the one or more geographic locations and the current geographic location based on the current geographic location of the wireless communications device.

27. The method of claim 20 wherein analyzing the one or more geographic locations and a current geographic location of the wireless communications device to determine a call pattern comprises analyzing the one or more geographic locations and the current geographic location based on the establishment of a communications link with a corresponding transceiver.

28. The method of claim 20 wherein analyzing the one or more geographic locations and a current geographic location of the wireless communications device to determine a call pattern comprises analyzing the geographic locations and a current geographic location based on a current time.

29. The method of claim 20 further comprising calculating a time difference between a current time and a time at which the one or more previous calls were placed to the remote party, and predicting the placement of the subsequent outgoing call if the calculated time difference does not exceed a predetermined threshold.

30. The method of claim 29 further comprising adjusting the calculated time difference based on time zone information received from the wireless communications network.

31. The method of claim 30 further comprising predicting the placement of the subsequent outgoing call based on a day that the one or more previous outgoing calls were placed to the remote party.

32. The method of claim 20 further comprising predicting the placement of the subsequent outgoing call based on an operating mode that the wireless communications device was in when the one or more previous outgoing calls were placed to the remote party.

33. The method of claim 20 further comprising predicting the placement of the subsequent outgoing call based on an identity of a short-range transceiver with which the wireless communications device had previously established a short-range communications link when the one or more previous outgoing calls were placed to the remote party.

34. The method of claim 20 further comprising computing a distance between the current location of the wireless communications device and the one or more geographic locations stored in memory, and predicting the placement of the subsequent outgoing call if the computed distance is not greater than a predetermined threshold.

35. The method of claim 20 further comprising predicting the placement of the subsequent outgoing call based on an identity of a base station with which the wireless communications device was registered when the one or more previous outgoing calls were placed to the remote party.

36. The method of claim 20 further comprising generating a graphical interface based on the determined call pattern, and placing the subsequent call responsive to the user actuating the graphical interface.

37. The method of claim 20 further comprising:

determining a location of the wireless communications device when the user places the subsequent call to the remote party; and updating the one or more geographic locations with the determined location.

* * * * *